(12) United States Patent
Buxbaum et al.

(10) Patent No.: US 9,727,438 B2
(45) Date of Patent: Aug. 8, 2017

(54) EVALUATING DATAFLOW GRAPH CHARACTERISTICS

(75) Inventors: Mark Buxbaum, Acton, MA (US); Dima V. Feinhaus, Newton, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 690 days.

(21) Appl. No.: 13/217,778

(22) Filed: Aug. 25, 2011

(65) Prior Publication Data

US 2012/0054255 A1 Mar. 1, 2012

Related U.S. Application Data

(60) Provisional application No. 61/376,878, filed on Aug. 25, 2010.

(51) Int. Cl.
*G06F 11/34* (2006.01)
*G06F 9/50* (2006.01)

(52) U.S. Cl.
CPC ............ *G06F 11/3476* (2013.01); *G06F 9/50* (2013.01)

(58) Field of Classification Search
CPC .................... G06F 11/3466; G06F 11/3476
See application file for complete search history.

(56) References Cited

U.S. PATENT DOCUMENTS 5,475,844 A * 12/1995 Shiramizu et al. ............ 718/104
5,966,072 A * 10/1999 Stanfill et al. ................ 340/440
2007/0118839 A1   5/2007 Berstis et al.
2007/0271381 A1 * 11/2007 Wholey et al. ............... 709/226
2010/0138388 A1 *  6/2010 Wakeling et al. ............. 707/634

FOREIGN PATENT DOCUMENTS

CN    101443733      5/2009
JP    H04-109341    4/1992
JP    2009-537908  10/2009

OTHER PUBLICATIONS

Chinese Office Action, CN201180040705, mailed Jan. 26, 2015 (22 pages).
Japanese Office Action (with English Translation), JP2013-526149, mailed Mar. 19, 2015, 9 pages.
Chinese Office Action (English Translation), CN201180040705, mailed Oct. 27, 2015 (15 pages).

* cited by examiner

*Primary Examiner* — Chuong D Ngo
(74) *Attorney, Agent, or Firm* — Fish & Richardson P.C.

(57) ABSTRACT

One or more expressions are evaluated that represent one or more characteristics of a dataflow graph that includes vertices representing data processing components connected by links representing flows of work elements between the components. A request is received by a computing system to evaluate the one or more expressions that include one or more operations on one or more variables; and the one or more expressions are evaluated by the computing system. The evaluating includes: defining a data structure that includes one or more fields, collecting, during execution of the dataflow graph, tracking information associated with one or more components of the dataflow graph, storing values associated with the tracking information in the one or more fields, and replacing one or more variables of the one or more expressions with the values stored in the one or more fields to compute a result of evaluating the one or more expressions.

112 Claims, 4 Drawing Sheets

EVALUATING DATAFLOW GRAPH CHARACTERISTICS

CROSS-REFERENCE TO RELATED APPLICATIONS

This application claims priority to U.S. Application Ser. No. 61/376,878, filed on Aug. 25, 2010, incorporated herein by reference.

BACKGROUND

This description relates to evaluating dataflow graph characteristics.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. A system that implements such graph-based computations is described in U.S. Pat. No. 5,966,072, EXECUTING COMPUTATIONS EXPRESSED AS GRAPHS.

SUMMARY

In one aspect, in general, a method is performed by a computing system for evaluating one or more expressions that represent one or more characteristics of a dataflow graph that includes vertices representing data processing components connected by links representing flows of work elements between the components. The method includes: receiving, by the computing system, a request to evaluate the one or more expressions that include one or more operations on one or more variables; and evaluating the one or more expressions, by the computing system. The evaluating includes: defining a data structure that includes one or more fields, collecting, during execution of the dataflow graph, tracking information associated with one or more components of the dataflow graph, storing values associated with the tracking information in the one or more fields, and replacing one or more variables of the one or more expressions with the values stored in the one or more fields to compute a result of evaluating the one or more expressions.

Aspects can include one or more of the following features.

The evaluating is performed while the dataflow graph is being executed.

The tracking information is further associated with one or more components of one or more subgraphs of the dataflow graph.

At least a first variable of the one or more variables is expressed in the expression as a term that includes a reference to a first subgraph one of the one or more subgraphs.

The first variable includes a reference to a first component within the first subgraph.

At least one of the one or more variables corresponds to a characteristic of one or more of the dataflow graph, the one or more subgraphs, and the one or more components.

Evaluating the one or more expressions includes evaluating the one or more expressions according to a predefined condition.

The predefined condition includes a detection of a trigger event.

The trigger event includes a determination that one or more processing resources are scarce relative to demand for the one or more processing resources.

Defining the data structure includes traversing the dataflow graph to identify one or more of a type and a number of the one or more fields.

Traversing the dataflow graph includes traversing the portions of the dataflow graph associated with the one or more expressions.

Collecting tracking information associated with one or more components of the dataflow graph includes filtering the tracking information based at least in part on the one or more expressions.

The method further includes comparing the result against one or more threshold values.

The method further includes generating a notification in response to the comparing.

The method further includes executing one or more automated processes based at least in part on the notification.

The method further includes receiving the one or more expressions from a user interface.

The method further includes providing a set of predefined expressions that includes the one or more expressions.

The evaluating further includes periodically evaluating the one or more expressions.

The method further includes generating a histogram associated with one or more characteristics using two or more results.

The method further includes updating stored historical data based at least in part on results of periodically evaluating the one or more expressions.

At least one of the one or more variables depends on a value that was stored in the historical data before the request to evaluate the one or more expressions was received by the computing system.

The method further includes storing multiple values associated with the tracking information in a vector within one of the one or more fields.

Each of the multiple values is associated with a different respective value of a particular parameter, and each of the multiple values is a value of a characteristic that is aggregated over tracking information associated with the respective value of the particular parameter.

In another aspect, in general, a computer-readable storage medium stores a computer program for evaluating one or more expressions that represent one or more characteristics of a dataflow graph that includes vertices representing data processing components connected by links representing flows of work elements between the components. The computer program includes instructions for causing a computer to: receive a request to evaluate the one or more expressions that include one or more operations on one or more variables; and evaluate the one or more expressions. The evaluating includes: defining a data structure that includes one or more fields, collecting, during execution of the dataflow graph, tracking information associated with one or more components of the dataflow graph, storing values associated with the tracking information in the one or more fields, and replacing one or more variables of the one or more expressions with the values stored in the one or more fields to compute a result of evaluating the one or more expressions.

In another aspect, in general, a computing system for evaluating one or more expressions that represent one or more characteristics of a dataflow graph that includes vertices representing data processing components connected by links representing flows of work elements between the components. The computing system includes: an input device or port configured to receive a request to evaluate the one or more expressions that include one or more operations on one or more variables; and at least one processor configured to evaluate the one or more expressions. The evaluating includes: defining a data structure that includes one or more fields, collecting, during execution of the dataflow graph, tracking information associated with one or more components of the dataflow graph, storing values associated with the tracking information in the one or more fields, and replacing one or more variables of the one or more expressions with the values stored in the one or more fields to compute a result of evaluating the one or more expressions.

In another aspect, in general, a computing system for evaluating one or more expressions that represent one or more characteristics of a dataflow graph that includes vertices representing data processing components connected by links representing flows of work elements between the components. The computing system includes: means for receiving a request to evaluate the one or more expressions that include one or more operations on one or more variables; and means for evaluating the one or more expressions. The evaluating includes defining a data structure that includes one or more fields, collecting, during execution of the dataflow graph, tracking information associated with one or more components of the dataflow graph, storing values associated with the tracking information in the one or more fields, and replacing one or more variables of the one or more expressions with the values stored in the one or more fields to compute a result of evaluating the one or more expressions.

Aspects can include one or more of the following advantages.

When a dataflow graph is being executed in an execution environment, it is often useful to monitor execution of the dataflow graph, for example, to track progress of various computations being performed by the components of the dataflow graph or to sample various characteristics relating to the data processing that is being performed. In some cases, a user may want to track the amount of data being processed (e.g., number of records, or number of bytes of data) and/or the amount of resources being consumed during the data processing (e.g., the CPU time being used by a component, or latency associated with a component). Some execution environments are configured to provide a user interface that receives a stream of tracking data for showing various characteristics displayed in a window that is part of the user interface.

Some of the techniques described herein enable a user to dynamically and flexibly provide expressions that define certain characteristics that the user may be interested in monitoring. In some cases, the user may provide an expression for monitoring a dataflow graph during execution of that dataflow graph. The characteristic may be associated with a portion of the dataflow graph (e.g., a component or a dataflow link) that is within a subgraph of the dataflow graph. The user is able to use a notation that enables a fully qualified path to be specified that enables the system to traverse (or "walk") the appropriate portions of a representation of the dataflow graph (e.g., a representation of the dataflow graph as a directed graph whose nodes represent the components and whose links represent the dataflows). By generating a data structure to hold portions of the tracking information that are needed to evaluate the expression provided by the user, the expression can be evaluated on the fly in an efficient manner using the appropriate information aggregated and encapsulated from a live stream of tracking information. The user does not need to be able to understand or read the tracking information, but can simply generate an understandable expression based on which the system is able to acquire the appropriate tracking information and evaluate the expression using the most recent information.

Other features and advantages of the invention will become apparent from the following description, and from the claims.

DESCRIPTION

Figure 1:
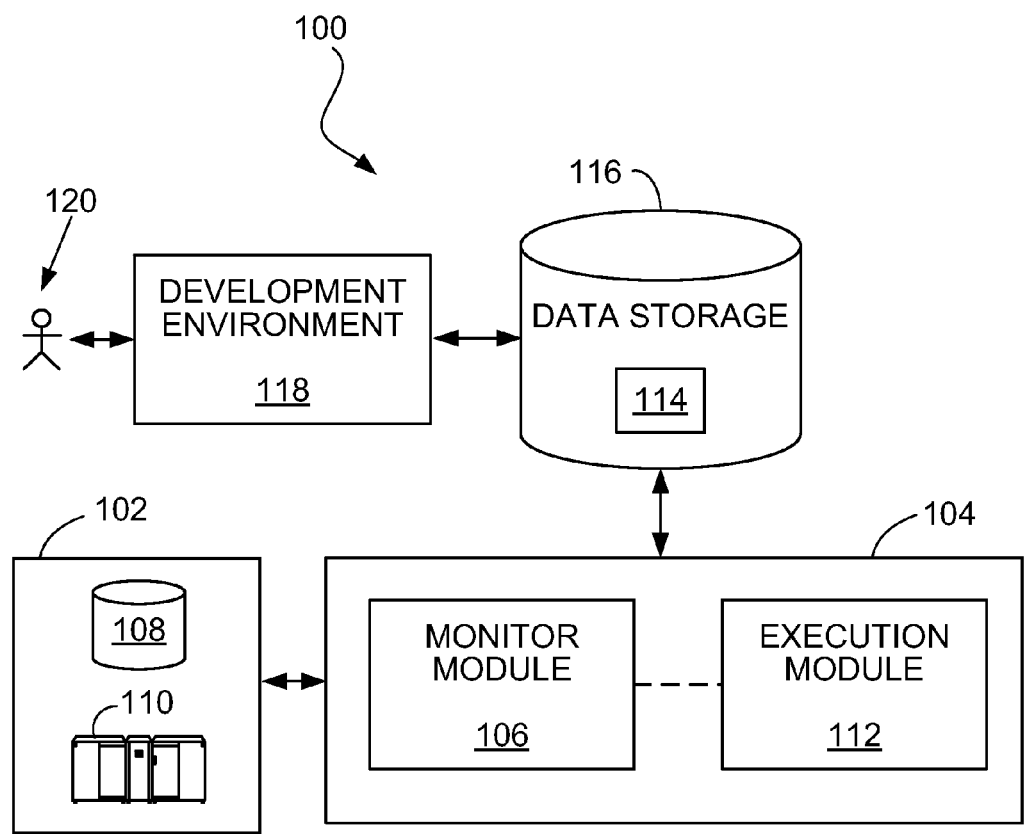
FIG. 1 is a block diagram of a system for executing graph-based computations.

FIG. 1 shows an exemplary data processing system 100 in which techniques for evaluating dataflow graph characteristics can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a monitor module 106 and an execution module 112. The monitor module 106 includes one or more processes for monitoring characteristics of one or more processes running on the execution module 112. For example, the execution module 112 can be configured to execute applications as dataflow graphs that include vertices (representing data processing components or datasets) connected by directed links (representing flows of work elements) between the vertices. A data processing component can have any number of input ports for receiving work elements on input dataflows and any number of output ports for providing work elements on output dataflows. The monitor module 106 can be configured to monitor characteristics of one or more dataflow graphs as they are being executed. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

In some examples, the monitor module 106 reads data from a data storage system 116. For example, the monitor module 106 can access one or more expressions 114 stored in the data storage system 116. The monitor module 106 can use the expressions 114 to evaluate characteristics of a dataflow graph being executed by the execution module 112. As discussed in greater detail below, the monitor module 106 can use tracking information associated with the dataflow graph to evaluate the expressions 114. The execution module 112 reads data from the data source 102 as input to the dataflow graph being executed to process the input data.

Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 may execute one or more computer processes (e.g., processes associated with the components of dataflow graphs), and the monitor module 106 can monitor the activities of the dataflow graph as it is being executed by execution module 112 (e.g., also using one or more monitoring processes running in the execution environment along with the graph processes run by the execution module 112). The data storage system 116 is also accessible to a development environment 118 in which a developer 120 is able to define or enter expressions 114 that represent one or more characteristics of a dataflow graph, or is able to take actions using the results of evaluated expressions, as described below. The expressions 114 can be defined in terms of one or more operations on one or more variables that represent different properties of a dataflow graph. The result of the operations yields a value of the expression that represents a characteristic that the user desires to monitor. The development environment 118 is, in some implementations, a system for developing applications as dataflow graphs. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The system 100 can receive data from a variety of types of systems including different forms of database systems. The data may be organized as records having values for respective fields (also called "attributes" or "columns"), including possibly null values. When first reading data from a data source 102, the execution module 112 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

Figure 2:
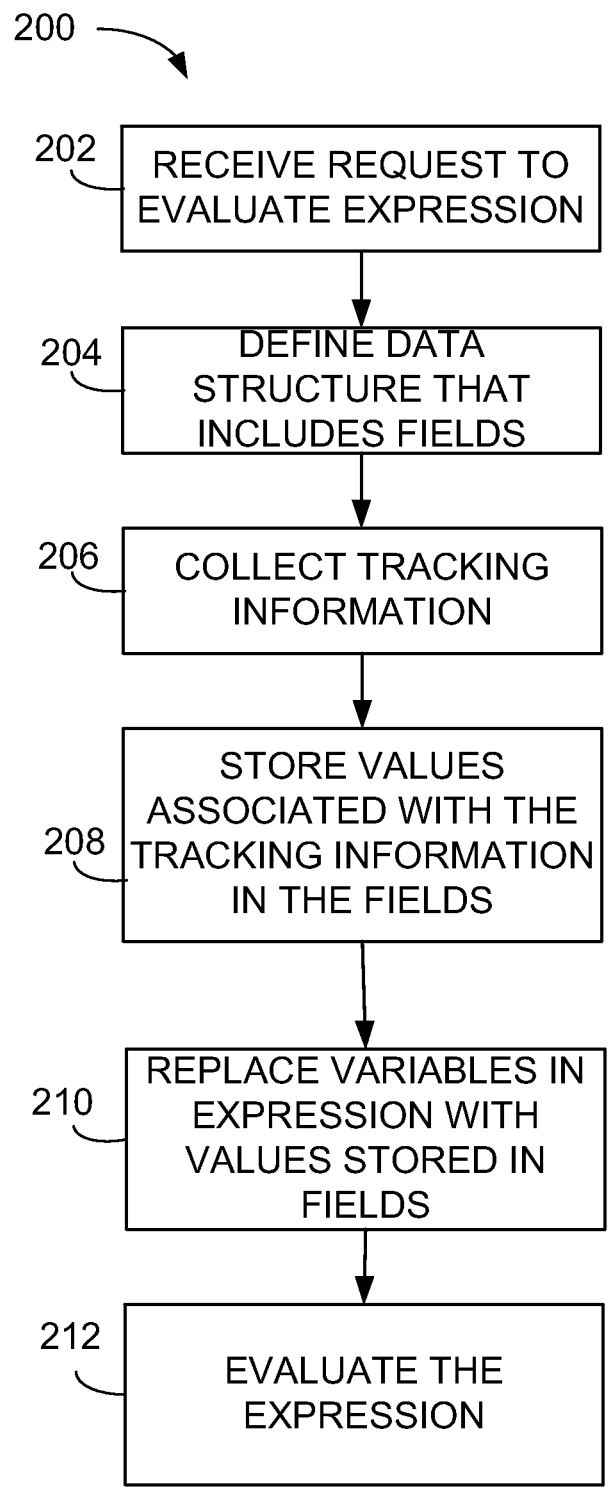
FIG. 2 is a flowchart of an exemplary procedure for evaluating dataflow graph characteristics.

FIG. 2 shows a flowchart for an exemplary procedure 200 for evaluating dataflow graph characteristics. The procedure begins when a system (e.g., system 100 (FIG. 1)) receives a request to evaluate an expression that represents one or more characteristics of a dataflow graph (202). After receiving the request to evaluate the expression, the system defines a data structure that includes one or more fields (204). In some examples, the data structure is an in-memory data structure whose fields are defined by traversing a representation of the dataflow graph whose execution is being monitored. In general, the fields in the data structure are configured to hold the data that is necessary for the evaluation of the expression.

The system 100 collects tracking information during execution of the dataflow graph by aggregating tracking information associated with different portions of the dataflow graph (206), as described in more detail below. In general, tracking information is produced while the dataflow graph is being executed and can provide information about the operation of the dataflow graph and its components and subcomponents, as well as the amount of resources that various operations are consuming. Once the tracking information has been collected and/or aggregated (or as the tracking information is being collected and/or aggregated), the system stores values associated with the tracking information in the fields of the in-memory data structure (208). After the values have been stored in the data structure, variables in the expression being evaluated are replaced using the values stored in the fields of the data structure (210). With the variables replaced with known quantities, the system can then evaluate the expression to provide a result (212). As shown in the example of FIG. 4, the result can be used in further processing tasks. The result can also be stored in a collection of historical data that can be used for evaluating other expressions, as described in more detail below in the example of FIG. 3.

Dataflow graphs can be specified with various levels of abstraction. A "subgraph" which is itself a dataflow graph containing components and links can be represented within another containing dataflow graph as a single component, showing input ports that provide input to the components within the subgraph and output ports that provide output from the components within the subgraph. Subgraphs enable modularity and reusability in developing dataflow graphs and the ability to hide complexity of subsets of components and links between them from the developer at a given level of the dataflow graph, while allowing the developer to drill down to a lower level into a given subgraph to view the components and links within that subgraph.

Figure 3:
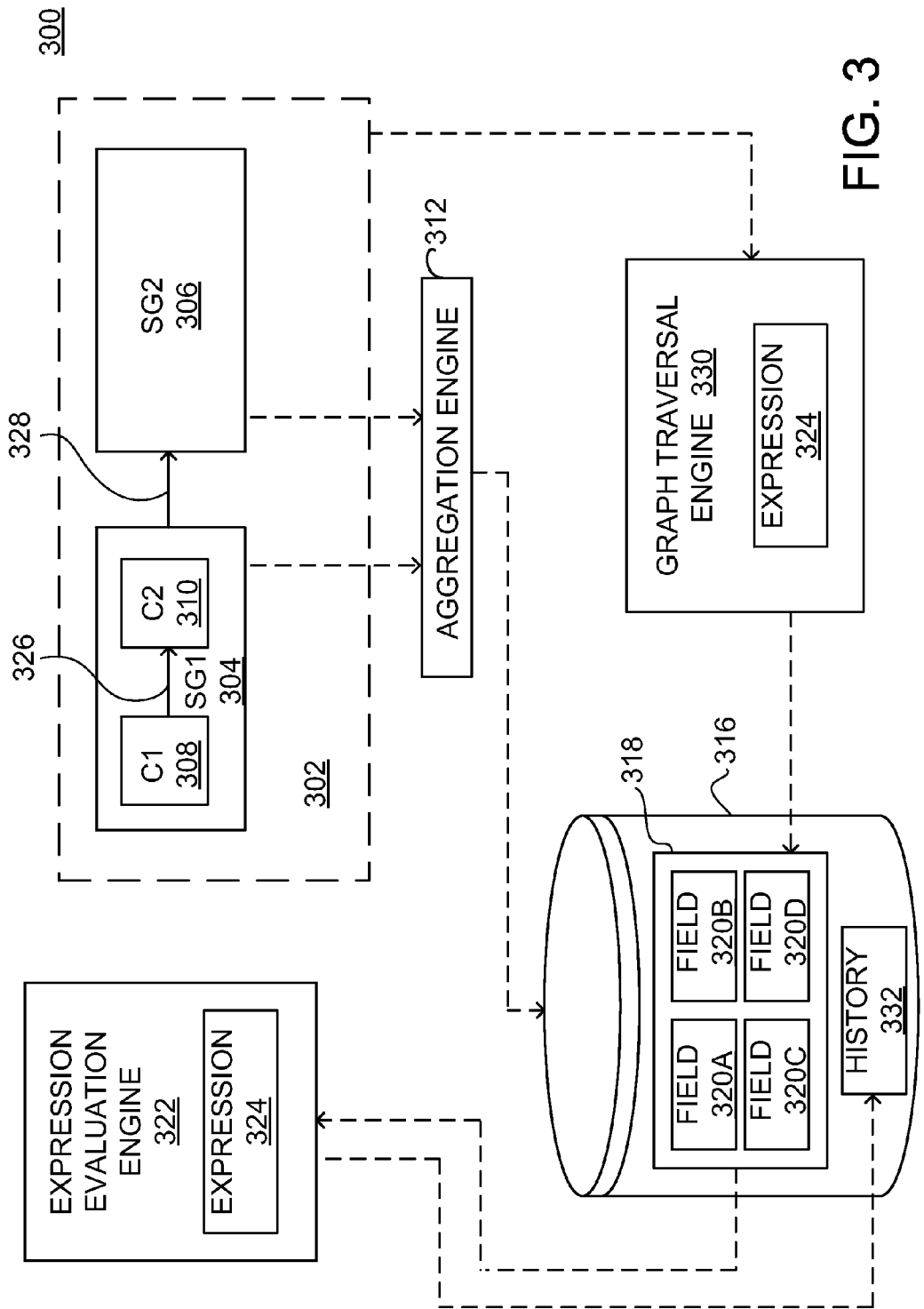
FIG. 3 is a block diagram of a system for monitoring a dataflow graph.
Figure 4:
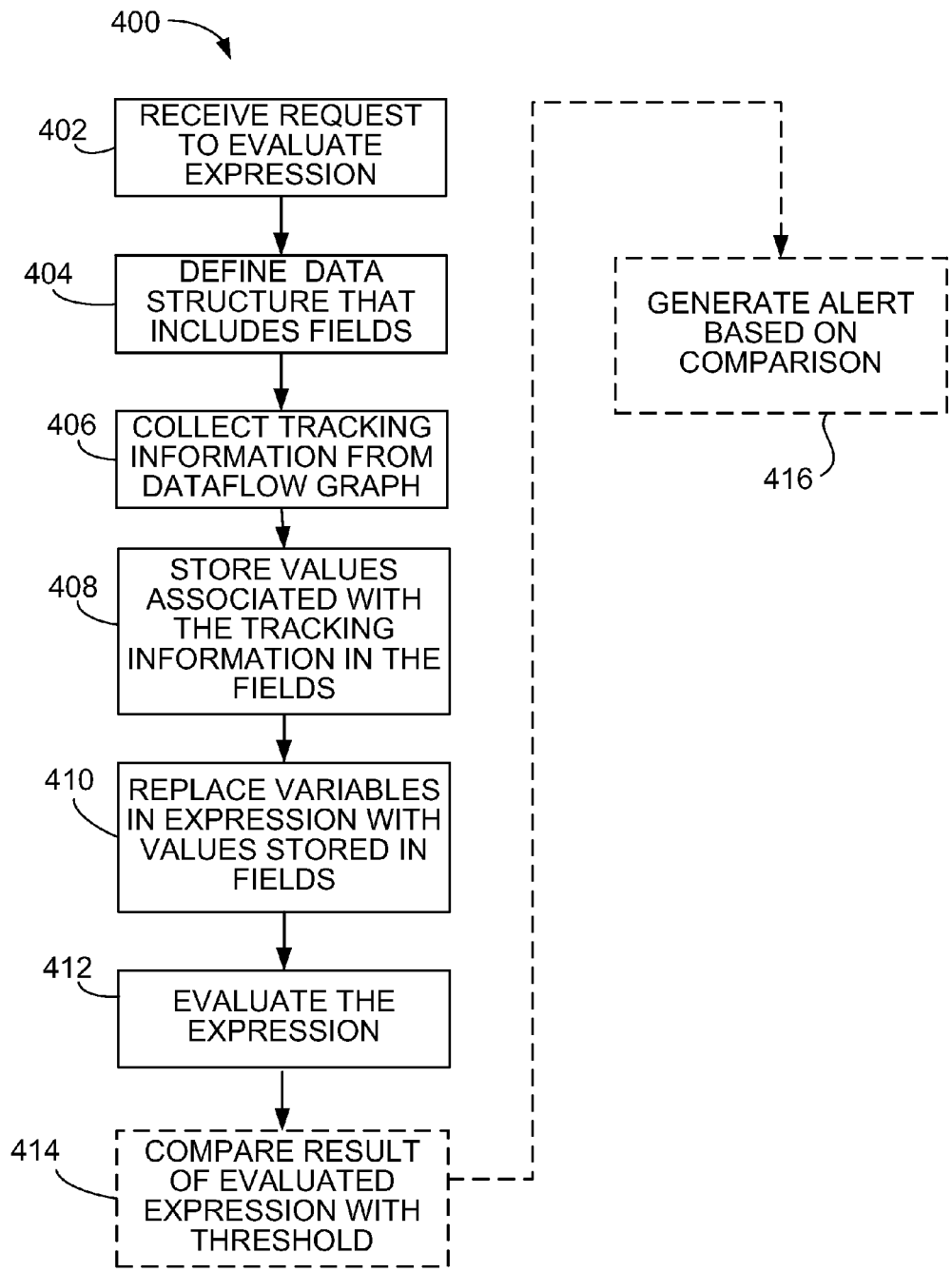
FIG. 4 is a flowchart of an exemplary procedure for evaluating dataflow graph characteristics.

FIG. 3 shows an exemplary system 300 that monitors characteristics of a dataflow graph 302 executed by the execution module 112, including a data store 316, an expression evaluation engine 322 and a graph traversal engine 330 that are both used by the monitor module 106 to receive and evaluate an expression 324 to provide a result that represents a monitored characteristic of the dataflow graph 302. The expression 324 can be accessible to the expression evaluation engine 322 and graph traversal engine 330 from the data storage system 116, for example. The dataflow graph 302 includes a first subgraph 304 and a second subgraph 306 that are connected by a link 328 representing a dataflow (e.g., a flow of data elements such as records provided from the data source 102 and processed by the subgraphs). The subgraph 304 includes a first component "C1" 308 and a second component "C2" 310 that are connected by a link 326 representing a dataflow (e.g., a flow of data elements such as records provided from the data source 102 and processed by the components). The system 300 also includes an aggregation engine 312 that aggregates tracking information associated with execution of the components and subgraphs of the graph 302, and which is communicatively connected to data store 316. The aggregation engine 312 is configured to pass the tracking information associated with the dataflow graph 302 and its subgraphs and components to the expression evaluation engine 322, which is also communicatively connected to the data store 316, as will be described in further detail below. The aggregation engine 312 can be implemented as part of the execution module 112, or alternatively as part of the monitor module 106.

While only one dataflow graph and a few subgraphs and components are shown, a dataflow graph is a modular entity and may be connected to or combined with other dataflow graphs. Furthermore, while the example of FIG. 3 is a simplified example showing a relatively small number of subgraphs, and components, the dataflow graph 302 can include any number of subgraphs, and each subgraph can include any number of components.

In some examples, the data store 316 is stored in memory of the data storage system 116 (e.g., volatile and/or non-volatile memory). The data store 316 stores at least one data structure 318 for storing aggregated tracking information. In some examples, the data structure 318 includes one or more fields 320A, 320B, 320C, and 320D for storing one or more tracking information values in records having a structure defined by the fields.

In the example of FIG. 3, the graph traversal engine 330 analyzes the expression 324 to determine what information will be needed when traversing a representation of the dataflow graph 302 to determine a definition of the data structure 318, as described in more detail below. This traversal may occur before execution of the dataflow graph 302 or during execution of the dataflow graph 302, in response to receiving a new expression 324. During execution of the dataflow graph 302, the aggregation engine 312 populates the defined data structure 318 with aggregated tracking information. The expression evaluation engine 322 uses the populated data structure 318 to evaluate the expression 324. After the expression 324 is evaluated, the result of the evaluation will provide a representation of one or more characteristics of the dataflow graph 302. The result can optionally be stored in a collection of historical data 332 in the data store 316.

In some examples, a user such as the developer 120 (FIG. 1) enters the expression 324 to evaluate through a user interface. Users can enter a new expression for evaluation (e.g., a user can define a new expression to be evaluated using some form of programming language or expression creation tool), or users can enter an existing expression, such as an expression selected from a list of saved expressions, such as a pre-set expression or a default expression. In general, users can enter expressions in order to obtain information about particular characteristics of one or more dataflow graphs. For example, if a user wishes to evaluate the amount of resources (e.g., CPU resources such as time that one or more CPUs spend executing processes for a component) that components C1 and C2 are consuming, the user could select or create the following expression:

CPU Resources Consumed=(SG1.C1.cpu+ SG1.C2.cpu)

The expression above is an example of a "dot notation" expression. Terms in the expression include names that correspond to different portions of a dataflow graph (e.g., subgraphs, components, ports, links) and characteristics associated with those portions of the dataflow graph. The "dots" in the expression that occur between names of subgraphs or components indicate that the subgraph or component on the right of the "dot" occurs within the subgraph or component on the left of the "dot." The final name after the last "dot" in the expression corresponds to a characteristic of the element to the left of the "dot" that is being monitored. The term "SG1.C1.cpu" provides the CPU resources being consumed by the component C1 308 and, similarly, the term "SG1.C2.cpu" provides the CPU resources being consumed by the component C2 310. In the expression above, the two terms are added to obtain the total CPU resources being consumed by the two components C1 308 and C2 310. The terms SG1.C1.cpu and SG1.C2.cpu are variables that can be supplied with values from the fields of the data structure 318 prior to, or during evaluation of the expression.

Some characteristics, including CPU resources, can be broken down by a particular parameter, to separately monitor that characteristic for different values of that parameter. For example, multiple different values for a CPU resources variable can be stored (e.g., as a vector) in a field of the data structure 318 for respective values of a "host" parameter. A particular component in a particular subgraph may have different threads executing in parallel on different host computers. Each host computer may have more than one CPU. In this example, the aggregation engine 312 aggregates CPU time over all of the CPUs on each host to yield a single value of CPU time for each host. These values are stored in a vector in a field of the data structure 318. When the field is used to supply a value to a variable of an expression, the result of the expression can be displayed to a user, optionally, as a total result or as a result broken down by host. If the result of the expression is used for additional processing (e.g., to define an alert) the user can check indicate (e.g., using a checkbox) whether the total result is to be used, or the individual results broken down by host are to be used. For example, when defining a threshold associated with the expression for determining when to trigger an alert, if a "total" checkbox is checked, a single input interface is provided to receive a threshold value to be associated with the total result of the expression. If the "total" checkbox is not checked, multiple input interfaces are provided to receive multiple threshold values to be associated with the respective results for each host.

While in the example above the expression 324 defines a characteristic relating to the CPU resources being consumed by two components of the dataflow graph 302, the expression evaluation engine 322 can also be used to evaluate expressions that represent other characteristics. For example, expressions can be evaluated to provide a number of records (or bytes) passing through a component, a number of records (or bytes) read from an input dataset or written to an output dataset, elapsed time, etc. Some characteristics can be expressed in terms of other characteristics, for example, num_records/elapsed_time represents an average processing rate (e.g., in units of records/second). The expression evaluation engine 322 can also evaluate a plurality of expressions simultaneously, and can be further configured to evaluate expressions according to a pre-defined schedule. For example, the expression evaluation engine 322 can be configured to evaluate the expression 324 once every hour, or upon the detection of one or more trigger events or conditions, such as a determination that processing resources are becoming scarce relative to demand for those resources.

After receiving an indication that the expression 324 is to be evaluated, the graph traversal engine 330 defines the data structure 318 within the data store 316 based on a lexical analysis of the expression 324 and an analysis of the dataflow graph 302 determined by traversing the representation of the dataflow graph. For example, a term used to refer to a component will have a structure that depends on how deep in the levels of the dataflow graph the component is positioned. The dot notation provides a fully qualified path for traversing the representation of the dataflow graph to reach the component of interest, expressed as: <subgraph>.<component>. A term used to refer to a link between components is expressed as: <component>_to_<component>. The data structure 318 includes fields that are configured to hold values that will eventually be supplied to the expression evaluation engine 322 to take the place of one or more variables in the expression 324.

Before generating the data structure 318, the graph traversal engine 330 traverses (or "walks") the representation of the dataflow graph 302 to determine the number and type of fields 320A-D that are required to evaluate the expression 324. In some procedures for traversing the dataflow graph 302, the graph traversal engine 330 begins by examining the dataflow graph 302 at the highest level of the dataflow graph 302 (with components and subgraphs being represented as nodes at the highest level), and following the dataflow links connecting the nodes of the dataflow graph 302 to compare variable names in the expression to names of portions of the dataflow graph (e.g., components, ports, links) in order to identify the portions of the dataflow graph that are relevant to the evaluation of the expression 324. That is, the graph traversal engine 330 analyzes the expression 324 and the dataflow graph 302 to define one or more fields of a particular type (e.g., a data type). For example, in the expression shown above, the data structure 318 would have two fields each of a type related to CPU resources. The topology of the dataflow graph 302 (as determined by the graph traversal engine 330) defines the number and type of fields included in the data structure 318. For example, if a dataflow graph is represented as a directed graph of nodes having a tree topology, based on the expression, the graph traversal engine 330 is able to determine which paths should be traversed from the root to the nodes/links that represent the components/dataflows referenced in the expression. If a path does not include a node or link representing a component or dataflow referenced in the expression, then the graph traversal engine 330 may not need to traverse that path. Alternatively, in some implementations the graph traversal engine 330 may traverse the entire graph.

With the data structure 318 defined, the dataflow graph 302 is executed by the execution module 112, and during execution the monitor module 106 manages evaluation of one or more expressions. For each expression to be evaluated, a corresponding instance of a data structure is generated, based on a specification of the defined fields, to receive tracking information. The aggregation engine 312 receives input that indicates what tracking information is to be extracted from a flow of tracking information provided by the execution module 112. The aggregation engine 312 attempts to fill the defined fields 320A-D of the instance of the defined data structure 318 with values that are relevant to the evaluation of the expression 324. These values are provided by tracking information that is produced by the execution module 112 during execution of the dataflow graph 302. The execution module 112, as it executes the various subgraphs and components can produce tracking information, which is aggregated by the aggregation engine 312. In some examples, the aggregation engine 312 can be implemented using a process that runs along with the processes of the dataflow graph 302 to gather tracking information describing characteristics of the individual components, subgraphs, and data flows.

To supply the fields with appropriate tracking information, the aggregation engine 312 analyzes the generated instance of the data structure 318 in order to identify which aspects of the dataflow graph are relevant to evaluating the expression 324. The process of generating the instance of the data structure 318, in some implementations, includes using the graph traversal engine 330 to traverse the representation of the dataflow graph again during execution to obtain additional information (in addition to the defined fields) or to verify the structure of the dataflow graph (e.g., if a significant amount of time has passed since the initial traversal before execution).

Different types of aggregation may be needed for different aspects of a dataflow graph. One type of aggregation occurs to provide tracking information for one level of a dataflow graph from lower levels. For example, the aggregation engine 312 adds certain numbers within the tracking information representing characteristics of individual components within a subgraph (e.g., individual CPU time for each component), and provides the total sum to represent the characteristic of the subgraph (e.g., total CPU time). Other types of aggregation involve other aspects of a dataflow graph. For a parallel dataflow graph, there are multiple instances of a given component that process data received over an input dataflow in parallel (e.g., the data on the input dataflow can be partitioned among the different parallel instances, which may be executed in different CPUs, for example). The aggregation engine 312 aggregates the different tracking information for each instance of a parallel component to provide the aggregated value (e.g., total CPU time for each instance). After tracking information has been stored in the data structure 318 in the fields corresponding to the portions of the dataflow graph relevant to the evaluation of the expression 324 (e.g., the relevant data flows, components, or subgraphs), the expression evaluation engine 322 receives the data structure 318 and uses the stored information to evaluate the expression 324 (e.g., information about components C1 308 and C2 310. In some cases, the aggregation engine 312 provides more tracking information for those components than is necessary for the evaluation of the expression 324 (e.g., the aggregation engine 312 may provide tracking information relating to variables referenced in other expressions such as the number of records passing through the components, as well as the CPU usage of the components referenced in the expression 324 currently being evaluated); however, the expression evaluation engine 322 can be configured to filter out the unnecessary tracking information and to only extract the tracking information that is necessary for the evaluation of the expression 324.

After the relevant tracking information has been collected by the aggregation engine 312, the tracking information is stored in the data structure 318 in the appropriate fields. Because the fields 320A-D are of a defined "type," and because the tracking information has been filtered to be of the same type, the fields 320A-D can be supplied with tracking information that is of a compatible and appropriate type. After the fields 320A-D have been filled with relevant tracking information (or values associated with that tracking information), the data structure 318 has taken the form of a record that can be evaluated by the expression evaluation engine 322. At this point, the expression evaluation engine 322 can draw values from the fields 320A-D to substitute for the variables defined in the expression 324.

After the variables in the expression 324 have been substituted with values from the fields 320A-D, the expression evaluation engine 322 can evaluate the expression 324 to produce the desired result. Using the exemplary expression shown above, the result of evaluating that expression would indicate the total CPU usage of component C1 308 and component C2 310. The evaluation of the expression 324 may be performed while the dataflow graph is being executed.

FIG. 4 is an exemplary procedure 400 that is similar to the exemplary procedure 200 (FIG. 2), except for two optional operations 414, 416 that may be performed after a result is obtained from the evaluation of an expression. The procedure 400 begins when a system (e.g., system 100 (FIG. 1)) receives a request to evaluate an expression that represents one or more characteristics of a dataflow graph (402). After receiving the request to evaluate the expression, the system defines a data structure that includes one or more fields (404). In some examples, the data structure is an in-memory data structure whose fields are defined by traversing a representation of the dataflow graph that is being evaluated. In general, the fields in the data structure are configured to hold the data that is necessary for the evaluation of the expression.

The system 100 collects tracking information from the dataflow graph by aggregating tracking information generated from different portions of the dataflow graph (406). In general, tracking information is produced while the dataflow graph is being executed and can provide information about the operation of the dataflow graph and its components and subcomponents, as well as the amount of resources that various operations are consuming. Once the tracking information has been collected and/or aggregated (or as the tracking information is being collected and/or aggregated), the system stores values associated with the tracking information in the fields of the in-memory data structure (408). After the values have been stored in the data structure, variables in the expression being evaluated are replaced using the values stored in the fields of the data structure (410). With the variables replaced with known quantities, the system can then evaluate the expression to provide a result (412).

After the result has been determined, the system can compare the result against one or more threshold values (414). For example, suppose the system has evaluated the previously-described expression to obtain a result that represents an amount of CPU usage for components C1 308 and C2 310 (e.g., 80% usage). The system can compare the 80% result to a threshold value related to a maximum CPU usage associated with those two components (e.g., 50%). If the result exceeds the threshold, a notification can be generated in the system to alert an administrator of the condition (416). The notification can be in the form of an alert or alarm, or may cause an automated process to execute (e.g., freeing additional CPU resources to provide components C1 308 and C2 310 with additional resources).

In some examples, results can be used to illustrate one or more characteristics with respect to time, or with respect to other values. For example, the results from evaluating expressions can be used to generate a histogram, or other statistical values, that represents one or more evaluated characteristics based on the collected historical data 332. The histograms may be automatically generated periodically in the form of reports, or can be generated on-demand by an administrator of the system 300.

Since results of previously evaluated expressions are stored in the historical data 332, some expressions can include a term that is a function of the historical data 332, such as an average value of a variable computed over a predetermined number of previous evaluations of that variable. A user may write an expression comparing performance of a job that executes one or more graphs to past performance of that job. Such expressions can be used to generate history-based alerts (e.g., an alert notifying a user that a graph metric measured by an expression is departing from its historical value). By default, the system 300 can be configured to store in the historical data 332 a specified number of past results of each expression that is evaluated (e.g., from the most recent 50 job executions). The specified number can be configured by a user.

A value of a metric defined by a particular expression can be referenced in other expressions, including historical values of the metric. The following is an example of syntax of variables that can be used by a user to refer to historical or statistical values of a metric that depend on the historical data 332:

value: the current value of a metric for a job being monitored
max_value: the maximum value of a metric over the stored historical values
min_value: the minimum value of a metric over the stored historical values
avg_value: the average (mean) value of a metric over the stored historical values
stdev_value: the standard deviation of a metric over the stored historical values Using these variables, a user can construct Boolean expressions such as the following:

$$value > avg\_value + stdev\_value$$

which can be used to define a warning notification that is triggered when a value exceeds its historical average by more than a standard deviation.

In constructing history-based expressions, a user may also be given access to the underlying individual historical values in the historical data. For example, a metric's individual historical values can be references as a vector history[i] where i indicates how recently the value was captured. For example, if a metric is defined by an expression that represents CPU time consumed by a job, the value of the total CPU time used by the most recently completed job execution is represented as history[0]. The value for the next most recently completed execution is represented as history[1]. The depth of this history vector is expressed as history_length. The statistics such as max_value and avg_value are calculated over this number of historical values. If a job has run fewer than history_length times and the history[i] vector therefore has fewer than history_length stored historical values, the system 300 uses all stored historical values to compute statistics. Optionally, the system 300 may require a minimum number of historical values (e.g., at least 3) to be stored before providing statistics, so that the statistical values provided are more meaningful. Using the individual values available in history[i], a user is able to define history-based alerts. For example, the following expression represents the recent "drift" in a metric value as the difference of its current value from the average of its value over the last two job executions: value−(history[0]+history[1])/2. This Boolean expression can be used, for example, to notify a user when a graph job starts to depart in some way from the metrics characterizing its most recent performance.

In some examples, dataflow graphs may produce tracking information that is tailored to a particular user's interests. For example, while many dataflow graphs will produce data related to CPU usage, dataflow graphs can also be configured to produce tracking information related to a number of dollars passing through a particular component (e.g., if the user is in the financial services industry). Thus, the expressions can be a powerful tool for evaluating a characteristic that is of importance to a user's area of business.

The approach to evaluating data flow graph characteristics described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method performed by a computing system having a processor and a memory, the computing system for determining a performance characteristic of a dataflow graph that includes vertices representing data processing components connected by links representing flows of work elements between the data processing components, the method including:
   receiving, by the processor, data representing one or more expressions that represent a characteristic of the dataflow graph,
   defining, in the memory, fields having field types for an in-memory data structure, the defining being based on analysis of the one or more expressions,
   accessing, by the processor, tracking information produced during execution of the dataflow graph, the tracking information associated with one or more of the data processing components of the dataflow graph,
   storing, in the in-memory data structure, one or more values determined based on a portion of the tracking information in a corresponding field of the in-memory data structure, wherein the portion of the tracking information is extracted according to the field types for the defined fields for the in-memory data structure, and
   determining, by the processor, one or more of an amount of data being processed by the dataflow graph and an amount of resources being consumed during the processing by the dataflow graph by:
      selecting one or more values stored in the fields of the in-memory data structure, and
      evaluating the one or more expressions by replacing each of one or more variables of the one or more expressions with a corresponding one of the values stored in the fields of the in-memory data structure.

2. The method of claim 1, wherein the evaluating is performed while the dataflow graph is being executed.

3. The method of claim 1, wherein the tracking information is further associated with one or more components of one or more subgraphs of the dataflow graph.

4. The method of claim 3, wherein at least a first variable of the one or more variables is expressed in the one or more expressions as a term that includes a reference to a first subgraph one of the one or more subgraphs.

5. The method of claim 4, wherein the first variable includes a reference to a first component within the first subgraph.

6. The method of claim 3, wherein at least one of the one or more variables corresponds to a characteristic of one or more of (i) the dataflow graph, (ii) the one or more subgraphs, and (iii) the one or more components.

7. The method of claim 1, wherein evaluating the one or more expressions includes evaluating the one or more expressions according to a predefined condition.

8. The method of claim 7, wherein the predefined condition includes a detection of a trigger event.

9. The method of claim 8, wherein the trigger event includes a determination that one or more processing resources are scarce relative to demand for the one or more processing resources.

10. The method of claim 1, wherein defining the in-memory data structure includes traversing the dataflow graph to identify one or more of the field type and a number of the fields.

11. The method of claim 10, wherein traversing the dataflow graph includes traversing the portions of the dataflow graph associated with the one or more expressions.

12. The method of claim 1, including filtering the tracking information based at least in part on the one or more expressions.

13. The method of claim 1, further including comparing a result of the evaluating against one or more threshold values.

14. The method of claim 13, further including generating a notification based on the comparing.

15. The method of claim 14, including generating the notification when a result of evaluating the one or more expressions exceeds a threshold value indicative of the allowable performance characteristic.

16. The method of claim 14, further including executing one or more automated processes based at least in part on the notification.

17. The method of claim 1 wherein receiving the one or more expressions includes receiving the one or more expressions from a user interface.

18. The method of claim 1, further including providing a set of one or more predefined expressions that includes the one or more expressions, and in which receiving the one or more expressions includes receiving a selection of one or more of the predefined expressions.

19. The method of claim 1, wherein the evaluating further includes periodically evaluating the one or more expressions.

20. The method of claim 19, further including generating a histogram associated with one or more characteristics of the dataflow graph using two or more results of evaluating the one or more expressions.

21. The method of claim 19, further including updating stored historical data based at least in part on results of periodically evaluating the one or more expressions.

22. The method of claim 19, wherein at least one of the one or more variables depends on a value that was stored in the historical data before a request to evaluate the one or more expressions was received by the computing system.

23. The method of claim 1, wherein storing the one or more values includes storing the one or more values in a vector within the corresponding field.

24. The method of claim 23, wherein each of the one or more values is associated with a different respective value of a particular parameter, and each of the one or more values is a value of a characteristic that is aggregated over tracking information associated with the respective value of the particular parameter.

25. The method of claim 1, in which defining the fields for the in-memory data structure includes defining the fields for the in-memory data structure based on a lexical analysis of the one or more expressions.

26. The method of claim 1, including receiving a request to evaluate the one or more expressions.

27. The method of claim 1, including generating the notification when the result of evaluating the one or more expressions falls outside of a range of values indicative of an allowable performance characteristic.

28. The method of claim 1, wherein the in-memory data structure is stored in volatile memory.

29. The method of claim 1, wherein the in-memory data structure is stored in non-volatile memory.

30. The method of claim 1, wherein the amount of data being processed includes one or more of a number of records and a number of bytes.

31. The method of claim 1, wherein the amount of resources being consumed includes CPU time being used by a data processing component of the dataflow graph.

32. The method of claim 1, wherein the amount of resources being consumed includes a latency associated with a data processing component of the dataflow graph.

33. The method of claim 1, including extracting the portion of the tracking information according to the field types for the defined fields for the in-memory data structure.

34. A non-transitory computer-readable storage medium storing a computer program for determining a performance characteristic of a dataflow graph that includes vertices representing data processing components connected by links representing flows of work elements between the data processing components, the computer program including instructions for causing a computer having a processor and memory to:

receive, by the processor, data representing one or more expressions that represent a characteristic of the dataflow graph, define, in the memory, fields having field types for an in-memory data structure, the defining being based on analysis of the one or more expressions, access, by the processor, tracking information produced during execution of the dataflow graph, the tracking information associated with one or more of the data processing components of the dataflow graph, store, in the in-memory data structure, one or more values determined based on a portion of the tracking information in a corresponding field of the in-memory data structure, wherein the portion of the tracking information is extracted according to the field types for the defined fields for the in-memory data structure, and determine, by the processor, one or more of an amount of data being processed by the dataflow graph and an amount of resources being consumed during the processing by the dataflow graph by:

selecting one or more values stored in the fields of the in-memory data structure, and evaluate the one or more expressions by replacing each of one or more variables of the one or more expressions with a corresponding one of the values stored in the fields of the in-memory data structure.

35. The non-transitory computer-readable storage medium of claim 34, wherein the evaluating is performed while the dataflow graph is being executed.

36. The non-transitory computer-readable storage medium of claim 34, wherein the tracking information is further associated with one or more components of one or more subgraphs of the dataflow graph.

37. The non-transitory computer-readable storage medium of claim 36, wherein at least a first variable of the one or more variables is expressed in the one or more expressions as a term that includes a reference to a first subgraph one of the one or more subgraphs.

38. The non-transitory computer-readable storage medium of claim 37, wherein the first variable includes a reference to a first component within the first subgraph.

39. The non-transitory computer-readable storage medium of claim 36, wherein at least one of the one or more variables corresponds to a characteristic of one or more of (i) the dataflow graph, (ii) the one or more subgraphs, and (iii) the one or more components.

40. The non-transitory computer-readable storage medium of claim 34, wherein evaluating the one or more expressions includes evaluating the one or more expressions according to a predefined condition.

41. The non-transitory computer-readable storage medium of claim 40, wherein the predefined condition includes a detection of a trigger event.

42. The non-transitory computer-readable storage medium of claim 41, wherein the trigger event includes a determination that one or more processing resources are scarce relative to demand for the one or more processing resources.

43. The non-transitory computer-readable storage medium of claim 34, wherein defining the in-memory data structure includes traversing the dataflow graph to identify one or more of the field type and a number of the fields.

44. The non-transitory computer-readable storage medium of claim 43, wherein traversing the dataflow graph includes traversing the portions of the dataflow graph associated with the one or more expressions.

45. The non-transitory computer-readable storage medium of claim 34, including filtering the tracking information based at least in part on the expression.

46. The non-transitory computer-readable storage medium of claim 34, wherein the instructions cause the computer to compare a result of the evaluating against one or more threshold values.

47. The non-transitory computer-readable storage medium of claim 46, wherein the instructions cause the computer to generate a notification based on the comparing.

48. The non-transitory computer-readable storage medium of claim 47, wherein the instructions cause the computer to execute one or more automated processes based at least in part on the notification.

49. The non-transitory computer-readable storage medium of claim 34, wherein the instructions to receive the one or more expressions include instructions to cause the computer to receive the one or more expressions from a user interface.

50. The non-transitory computer-readable storage medium of claim 34, wherein the instructions cause the computer to provide a set of one or more predefined expressions that includes the one or more expressions, and in which receiving the expressions includes receiving a selection of one or more of the predefined expressions.

51. The non-transitory computer-readable storage medium of claim 34, wherein the evaluating further includes periodically evaluating the one or more expressions.

52. The non-transitory computer-readable storage medium of claim 51, wherein the instructions cause the computer to generate a histogram associated with one or more characteristics of the dataflow graph using two or more results of evaluating the one or more expressions.

53. The non-transitory computer-readable storage medium of claim 51, wherein the instructions cause the computer to update stored historical data based at least in part on results of periodically evaluating the one or more expressions.

54. The non-transitory computer-readable storage medium of claim 51, wherein at least one of the one or more variables depends on a value that was stored in the historical data before a request to evaluate the one or more expressions was received by the computing system.

55. The non-transitory computer-readable storage medium of claim 34, wherein storing the one or more values includes storing the one or more values in a vector within the corresponding field.

56. The non-transitory computer-readable storage medium of claim 55, wherein each of the one or more values is associated with a different respective value of a particular parameter, and each of the one or more values is a value of a characteristic that is aggregated over tracking information associated with the respective value of the particular parameter.

57. The non-transitory computer-readable storage medium of claim 34, in which defining the fields for the in-memory data structure includes defining the fields for the in-memory data structure based on a lexical analysis of the one or more expressions.

58. The non-transitory computer-readable storage medium of claim 34, wherein the instructions cause the computer to receive a request to evaluate the one or more expressions.

59. The non-transitory computer-readable storage medium of claim 34, wherein the instructions cause the computer to generate the notification when a result of evaluating the one or more expressions exceeds a threshold value indicative of an allowable performance characteristic.

60. The non-transitory computer-readable storage medium of claim 34, wherein the instructions cause the computer to generate the notification when a result of evaluating the one or more expressions falls outside of a range of values indicative of an allowable performance characteristic.

61. A computing system for determining a performance characteristic of a dataflow graph that includes vertices representing data processing components connected by links representing flows of work elements between the data processing components, the computing system including:
at least one processor and memory configured to:
receive, by the processor, data representing one or more expressions that represent a characteristic of the dataflow graph,
define, in the memory, fields having field types for an in-memory data structure, the defining being based on analysis of the one or more expressions,
access, by the processor, tracking information produced during execution of the dataflow graph, the tracking information associated with one or more of the data processing components of the dataflow graph,
store, in the in-memory data structure, one or more values determined based on a portion of the tracking information in a corresponding field of the in-memory data structure, wherein the portion of the tracking information is extracted according to the field types for the defined fields for the in-memory data structure, and
determine, by the processor, one or more of an amount of data being processed by the dataflow graph and an amount of resources being consumed during the processing by the dataflow graph by:
selecting one or more values stored in the fields of the in-memory data structure, and
evaluate the one or more expressions by replacing each of one or more variables of the one or more expressions with a corresponding one of the values stored in the fields of the in-memory data structure.

62. The computing system of claim 61, wherein the evaluating is performed while the dataflow graph is being executed.

63. The computing system of claim 61, wherein the tracking information is further associated with one or more components of one or more subgraphs of the dataflow graph.

64. The computing system of claim 63, wherein at least a first variable of the one or more variables is expressed in the one or more expressions as a term that includes a reference to a first subgraph one of the one or more subgraphs.

65. The computing system of claim 64, wherein the first variable includes a reference to a first component within the first subgraph.

66. The computing system of claim 63, wherein at least one of the one or more variables corresponds to a characteristic of one or more of (i) the dataflow graph, (ii) the one or more subgraphs, and (iii) the one or more components.

67. The computing system of claim 61, wherein evaluating the one or more expressions includes evaluating the one or more expressions according to a predefined condition.

68. The computing system of claim 67, wherein the predefined condition includes a detection of a trigger event.

69. The computing system of claim 68, wherein the trigger event includes a determination that one or more processing resources are scarce relative to demand for the one or more processing resources.

70. The computing system of claim 61, wherein defining the in-memory data structure includes traversing the dataflow graph to identify one or more of the field type and a number of the fields.

71. The computing system of claim 70, wherein traversing the dataflow graph includes traversing the portions of the dataflow graph associated with the one or more expressions.

72. The computing system of claim 61, including filtering the tracking information based at least in part on the one or more expressions.

73. The computing system of claim 61, wherein the processor is configured to compare a result of the evaluating against one or more threshold values.

74. The computing system of claim 73, wherein the processor is configured generate a notification based on the comparing.

75. The computing system of claim 74, wherein the processor is configured execute one or more automated processes based at least in part on the notification.

76. The computing system of claim 61, wherein receiving the one or more expressions includes receiving the one or more expressions from a user interface.

77. The computing system of claim 61, wherein the processor is configured to provide a set of one or more predefined expressions that includes the one or more expressions, and in which receiving the one or more expressions includes receiving a selection of one or more of the predefined expressions.

78. The computing system of claim 61, wherein the evaluating further includes periodically evaluating the one or more expressions.

79. The computing system of claim 78, wherein the processor is configured generate a histogram associated with one or more characteristics of the dataflow graph using two or more results of evaluating the one or more expressions.

80. The computing system of claim 78, wherein the processor is configured update stored historical data based at least in part on results of periodically evaluating the one or more expressions.

81. The computing system of claim 78, wherein at least one of the one or more variables depends on a value that was stored in the historical data before a request to evaluate the one or more expressions was received by the computing system.

82. The computing system of claim 61, wherein storing the one or more values includes storing the one or more values in a vector within the corresponding field.

83. The computing system of claim 82, wherein each of the one or more values is associated with a different respective value of a particular parameter, and each of the one or more values is a value of a characteristic that is aggregated over tracking information associated with the respective value of the particular parameter.

84. The computing system of claim 61, in which defining the fields for the in-memory data structure includes defining the fields for the in-memory data structure based on a lexical analysis of the one or more expressions.

85. The computing system of claim 61, wherein the processor is configured receive a request to evaluate the one or more expressions.

86. The computing system of claim 61, wherein the processor is configured to generate the notification when a result of evaluating the one or more expressions exceeds a threshold value indicative of an allowable performance characteristic.

87. The computing system of claim 61, wherein the processor is configured to generate the notification when a result of evaluating the one or more expressions falls outside of a range of values indicative of an allowable performance characteristic.

88. A computing system having a processor and a memory, the computing system for determining a performance characteristic of a dataflow graph that includes vertices representing data processing components connected by links representing flows of work elements between the data processing components, the computing system including:
    means for receiving, by the processor, data representing one or more expressions that represent a characteristic of the dataflow graph,
    means for defining, in the memory, fields having field types for an in-memory data structure, the defining being based on analysis of the one or more expressions,
    means for accessing, by the processor, tracking information produced during execution of the dataflow graph, the tracking information associated with one or more of the data processing components of the dataflow graph,
    means for storing, in the in-memory data structure, one or more values determined based on a portion of the tracking information in a corresponding field of the in-memory data structure, wherein the portion of the tracking information is extracted according to the field types for the defined fields for the in-memory data structure, and
    means for determining, by the processor, one or more of an amount of data being processed by the dataflow graph and an amount of resources being consumed during the processing by the dataflow graph by:
        selecting one or more values stored in the fields of the in-memory data structure, and
        evaluating the one or more expressions by replacing each of one or more variables of the one or more expressions with a corresponding one of the values stored in the fields of the in-memory data structure.

89. The computing system of claim 88, wherein the evaluating is performed while the dataflow graph is being executed.

90. The computing system of claim 88, wherein the tracking information is further associated with one or more components of one or more subgraphs of the dataflow graph.

91. The computing system of claim 90, wherein at least a first variable of the one or more variables is expressed in the one or more expressions as a term that includes a reference to a first subgraph one of the one or more subgraphs.

92. The computing system of claim 91, wherein the first variable includes a reference to a first component within the first subgraph.

93. The computing system of claim 90, wherein at least one of the one or more variables corresponds to a characteristic of one or more of (i) the dataflow graph, (ii) the one or more subgraphs, and (iii) the one or more components.

94. The computing system of claim 88, wherein evaluating the one or more expressions includes evaluating the one or more expressions according to a predefined condition.

95. The computing system of claim 94, wherein the predefined condition includes a detection of a trigger event.

96. The computing system of claim 95, wherein the trigger event includes a determination that one or more processing resources are scarce relative to demand for the one or more processing resources.

97. The computing system of claim 88, wherein defining the in-memory data structure includes traversing the dataflow graph to identify one or more of the field type and a number of the fields.

98. The computing system of claim 97, wherein traversing the dataflow graph includes traversing the portions of the dataflow graph associated with the one or more expressions.

99. The computing system of claim 88, including means for filtering the tracking information based at least in part on the one or more expressions.

100. The computing system of claim 88, further including means for comparing a result of the evaluating against one or more threshold values.

101. The computing system of claim 100, further including means for generating a notification based on the comparing.

102. The computing system of claim 101, further including means for executing one or more automated processes based at least in part on the notification.

103. The computing system of claim 88, wherein receiving the one or more expressions includes receiving the one or more expressions from a user interface.

104. The computing system of claim 88, further including means for providing a set of one or more predefined expressions that includes the one or more expressions, and in which receiving the one or more expressions includes receiving a selection of one or more of the predefined expressions.

105. The computing system of claim 88, wherein the evaluating further includes periodically evaluating the one or more expressions.

106. The computing system of claim 105, further including means for generating a histogram associated with one or more characteristics of the dataflow graph using two or more results of evaluating the one or more expressions.

107. The computing system of claim 105, further including means for updating stored historical data based at least in part on results of periodically evaluating the one or more expression.

108. The computing system of claim 105, wherein at least one of the one or more variables depends on a value that was stored in the historical data before a request to evaluate the one or more expressions was received by the computing system.

109. The computing system of claim 88, wherein storing the one or more values includes storing the one or more values in a vector within the corresponding field.

110. The computing system of claim 109, wherein each of the one or more values is associated with a different respective value of a particular parameter, and each of the one or more values is a value of a characteristic that is aggregated over tracking information associated with the respective value of the particular parameter.

111. The computing system of claim 88, in which defining the fields for the in-memory data structure includes defining the fields for the in-memory data structure based on a lexical analysis of the one or more expressions.

112. The computing system of claim 88, including means for receiving a request to evaluate the one or more expressions.

\* \* \* \* \*

UNITED STATES PATENT AND TRADEMARK OFFICE
CERTIFICATE OF CORRECTION

PATENT NO. : 9,727,438 B2  
APPLICATION NO. : 13/217778  
DATED : August 8, 2017  
INVENTOR(S) : Mark Buxbaum, Dima V. Feinhaus and Tim Wakeling Page 1 of 1

It is certified that error appears in the above-identified patent and that said Letters Patent is hereby corrected as shown below:

In the Claims

Column 16, Line 21, Claim 34, delete "evaluate" and insert -- evaluating --.

Column 18, Line 36, Claim 61, delete "evaluate" and insert -- evaluating --.

Column 19, Line 15, Claim 74, after "configured" insert -- to --.

Column 19, Line 18, Claim 75, after "configured" insert -- to --.

Column 19, Line 33, Claim 79, after "configured" insert -- to --.

Column 19, Line 37, Claim 80, after "configured" insert -- to --.

Column 19, Line 59, Claim 85, after "configured" insert -- to --.

Signed and Sealed this  
Third Day of October, 2017

Joseph Matal  
*Performing the Functions and Duties of the  
Under Secretary of Commerce for Intellectual Property and  
Director of the United States Patent and Trademark Office*